United States Patent [19]

Tenmoku et al.

[11] Patent Number: 4,807,127
[45] Date of Patent: Feb. 21, 1989

[54] VEHICLE LOCATION DETECTING SYSTEM

[75] Inventors: Kenji Tenmoku; Osamu Shimizu; Toshiyuki Shimizu; Kunihiko Mitoh, all of Osaka, Japan

[73] Assignee: Sumitomo Electric Industries, Ltd., Japan

[21] Appl. No.: 123,362

[22] Filed: Nov. 20, 1987

[30] Foreign Application Priority Data

Dec. 10, 1986 [JP] Japan .................................. 61-294215
May 11, 1987 [JP] Japan .................................. 62-113985

[51] Int. Cl.$^4$ .............................................. G06F 15/14
[52] U.S. Cl. .................................. 364/424.01; 340/988
[58] Field of Search ........................ 364/300, 424, 450; 340/988, 989, 990

[56] References Cited

U.S. PATENT DOCUMENTS 3,789,198  1/1974  Henson et al. ........................ 364/424
4,646,089  2/1987  Takanabe et al. ............... 364/424 X

FOREIGN PATENT DOCUMENTS 58-99715   6/1983  Japan .
58-113711  7/1983  Japan .

OTHER PUBLICATIONS

GEC Journal of Science & Technology, vol. 45, No. 1, 1978, pp. 34–44, *Landfall a High-Resolution Automatic Vehicle-Location System*, D. King.

Primary Examiner—Eugene R. LaRoche
Assistant Examiner—David Mis
Attorney, Agent, or Firm—Lane and Aitken

[57] ABSTRACT

A vehicle location detecting method for detecting the location of a vehicle within a predetermined area, comprising the steps of: outputting distance data at every predetermined interval, the distance data being representative of the distance that a vehicle has traveled, outputting heading angle data at every predetermined interval, the heading angle data being representative of the heading angle change of vehicle travel, storing road map data representative of roadways, computing a present location data from the distance data and the heading angle data, and a limit error of the present location data which is determined by errors in the distance data, in the heading angle data and in the road map data, and registering locations on the roadways, which roadways are located within the limit error of the present location data, as estimate locations, computing correlation coefficients corresponding to the registered estimate locations, and selecting a correlation coefficient whose error is smallest with respect to the roadway from the computed correlation coefficients and outputting the registered estimate location corresponding to the selected correlation coefficient as a present location.

33 Claims, 4 Drawing Sheets

VEHICLE LOCATION DETECTING SYSTEM

FIELD OF THE INVENTION

This invention relates in general to the field of a vehicle location detecting system, and in particular, to such a system which detects the locations of vehicles being travelling arbitrary streets and roadways of road traffic network without receiving data from the outside via radio waves and the like.

DESCRIPTION OF THE PRIOR ART

With an ever increasing number of vehicles on the road and with an increase in the number and complexity of roads, there is a demonstrated need for a system or systems which can detect the locations of vehicles which are travelling arbitrary streets and roadways of road traffic network. As a conventional vehicle location detecting system, there has been proposed a system which uses the principle of dead reckoning and which includes a distance sensor, a direction or heading sensor, and processing units for giving necessary processes to output signals from the distance and heading sensors. In the dead reckoning, data regarding the present location of a vehicle is obtained by adding the amount of changes in distance and heading to a last-known location data. However, there is the drawback that the distance and heading errors that are inevitably inherent in the distance and heading sensors are accumulated with vehicle travel, and errors in the present location data are also accumulated.

In order to eliminate the drawback described above, there have been proposed map matching systems (U.S. Pat. No. 3,789,198, Japanese patent laid-open publication No. 58-99715, Japanese patent laid-open publication No. 58-113711 and "LANDFALL A HIGH-RESOLUTION AUTOMATIC VEHICLE-LOCATION SYSTEM", D. KING, GEC Journal of Science & Technology, Vol. 45, No. 1, 1978). In the map matching systems, the present location data obtained according to the aforementioned dead reckoning is compared with previously stored road traffic network data, the departed amount of the present location data from the data is computed as an accumulated error, and the present location data is corrected to coincide with the stored road data, using the departed amount.

More specifically, in the vehicle location detecting system disclosed in the U.S. Pat. No. 3,789,198, the present location data of a vehicle is calculated upon distance data obtained by a distance sensor and heading data obtained by a heading sensor. The calculated present location data is compared with previously stored road location data. If the difference between the present location data and the road location data is within a predetermined threshold value, the present location data is corrected to correspond with the nearest road, and on the other hand, if the difference between the both data exceeds the predetermined threshold value, no correction is made, in order that correction is made with high precision and that the display of an accurate present location is made.

In the vehicle location detecting system disclosed in the Japanese patent laid-open publication No. 58-99715, to display an accurate present location, the present location data of a vehicle is updated at every predetermined distance by calculating the amounts of distance changes with respect to the coordinate directions of road map, and when the present location data is departed from the road, the location data corresponding to the nearest road is merely determined as a present location data.

In the vehicle location detecting system disclosed in the Japanese patent laid-open publication No. 58-113711, to display an accurate present location, errors arising from a heading sensor for detecting the direction or heading of vehicle travel with respect to the earth's magnetic axis are corrected by comparing the radius of curvature obtained upon the detected heading with that of the road.

In the vehicle location detecting system disclosed in the "LANDFALL A HIGH-RESOLUTION AUTOMATIC VEHICLE-LOCATION SYSTEM", to accurately display the present location of a vehicle as a location on the road, road traffic network is grouped into non-junction parts and a plurality of typical junction parts, and when the vehicle is travelling from any of junction parts toward other junction part, the travelled distance between the two junction parts is calculated upon the signal from a distance sensor, and when it is determined that the vehicle reached the junction part, the change in the heading of vehicle travel thereafter is detected by a heading sensor to determine junction exit into which the vehicle was directed.

In the case that road traffic network is relatively simple, any vehicle location detecting systems described above can display accurately the present location by correcting an increase in accumulated errors. However, when trucks and the like approach and in the areas where buildings, railway crossings and the like are present, a heading sensor is subjected to errors because of the influence of the external magnetic field, so that accumulated errors resulting from the heading sensor having larger errors as compared with a distance sensor are to be included in the present location data of a vehicle as an error which cannot be corrected. If, therefore, the present location date is corrected merely by corresponding with the nearest road, there will be the drawback that the road that is entirely different from the actual road is displayed as a present location.

Also, a distance sensor for detecting the distance that a travel travels is subjected to the influence of air pressure and the like of the tire and the accumulated errors in the distance sensor occasionally exceed an allowable limit error, so that the same drawback as the above case is to be involved in the conventional vehicle location detecting systems.

Furthermore, even if the probability of occurrence of such drawbacks described above were in a low condition, there would be the drawback that, once the drawbacks occur, the vehicle location thereafter becomes entirely inaccurate because it is calculated on the basis of the inaccurate present vehicle location, so that the vehicle location detecting systems of the type described above are not suitable for practical use.

Furthermore, in the case that road map is in error, that a vehicle travels a large or complicated intersecting point, that road map is partly omitted, that a vehicle travels roadway which are not shown in road map, for temporary reasons such as construction, traffic regulation and the like, or that a distance sensor or heading sensor is damaged and therefore the sensor error became large, a subject roadway cannot be detected, or the roadway that does not coincide with the actual route of a vehicle is detected as a present location. As a result, the present location is detected only by dead reckoning, and therefore the total locational error continues to increase because of sensor errors, and finally it is required to manually correct the present location to correspond with the actual route of a vehicle by an operator.

Therefore, it is an object of the present invention to provide an improved vehicle location detecting method and apparatus therefor which are capable of detecting an accurate present vehicle location without being subjected to the influence of complexity of road traffic network, errors in road map, a part omission of road map, sensor error and the like.

SUMMARY OF THE INVENTION

The object and others which will be realized from a consideration of the following specification are achieved by a vehicle location detecting method for detecting the location of a vehicle within a predetermined area, comprising the steps of: a vehicle location detecting method for detecting the location of a vehicle within a predetermined area, comprising the steps of: a. outputting distance data at every predetermined interval, the distance data being representative of the distance that a vehicle has travelled, b. outputting heading angle data at every predetermined interval, the heading angle data being representative of the heading angle change of vehicle travel, c. storing road map data representative of roadways, d. computing a present location data from the distance data and the heading angle data, and a limit error of the present location data which is determined by errors in the distance data, in the heading angle data and in the road map data, and registering locations on the roadways, which roadways are located within the limit error of the present location data, as estimate locations, e. computing correlation coefficients corresponding to the registered estimate locations, and f. selecting a correlation coefficient whose error is smallest with respect to the roadway from the computed correlation coefficients and outputting the registered estimate location corresponding to the selected correlation coefficient as a present location.

The object and others which will be realized from a consideration of the following specification are also achieved by a vehicle location detecting method for detecting the location of a vehicle within a predetermined area, comprising the steps of: a. outputting distance data at every predetermined interval, the distance data being representative of the distance that a vehicle has travelled, b. outputting heading angle data at every predetermined interval, the heading angle data being representative of the heading angle change of vehicle travel, c. storing road map data representative of roadways, d. computing a present location data from the distance data and the heading angle data, a first limit error of the present location data which is determined by errors in the distance data, in the heading angle data and in the road map data, and a wider limit error of the present location data which is wider than the first limit error, and registering locations on the roadways, which roadways are located within the first limit error of the present location data, as estimate locations, e. computing correlation coefficients corresponding to the registered estimate locations, f. selecting a correlation coefficient whose error is smallest with respect to the roadway from the computed correlation coefficients and outputting the registered estimate location corresponding to the selected correlation coefficient as a present location, and g. if the roadways, which are located within the first limit error of the present location data, do not exist, outputting the present location data computed from the distance data and the heading angle data as a present location, registering locations on the roadways, which roadways are located within the wider limit error of the present location data, as estimate locations, and when a correlation coefficient, whose error is less than a predetermined value and smallest with respect to each roadway of the registered estimate locations, is obtained, outputting the estimate location corresponding to the correlation coefficient as a present location.

The aforementioned object and others which will be realized from a consideration of the following specification are also achieved by a vehicle location detecting apparatus for detecting the location of a vehicle within a predetermined area, comprising a distance detecting part for outputting distance data representative of the distance that a vehicle has travelled, a heading detecting part for outputting heading angle data representative of the heading angle change of vehicle travel, a road map memory for storing therein road map data of a predetermined area, the road map data being representative of roadways, an estimate location computing part for computing a present location data from the distance data and the heading angle data, and a limit error of the present location data which is determined by errors in the distance data, in the heading angle data and in the road map data, and for registering locations on the roadways, which roadways are located within the limit error of the present location data, as estimate locations, a correlation coefficient computing part for computing correlation coefficients corresponding to the estimate locations, and a correlation coefficient evaluating part for evaluating large and small relation between the correlation coefficients computed by the correlation coefficient computing part and for storing as an actual location the estimation location corresponding to the correlation coefficient which is largest among the correlation coefficients computed by the correlation coefficient computing part.

The aforementioned object and others which will be realized from a consideration of the following specification are also achieved by a vehicle location detecting apparatus for detecting the location of a vehicle within a predetermined area, comprising a distance detecting part for outputting distance data representative of the distance that a vehicle has travelled, a heading detecting part for outputting heading angle data representative of the heading angle change of vehicle travel, a road map memory for storing therein road map data of a predetermined area, the road map data being representative of roadways, an estimate location computing part for computing a present location data from the distance data and the heading angle data, a first limit error of the present location data which is determined by errors in the distance data, in the heading angle data and in the road map data, and a second limit error which is wider than the first limit error, and for registering locations on the roadways, which roadways are located within the limit error of the present location data, as estimate locations, a correlation coefficient computing part for computing correlation coefficients corresponding to the estimate locations, and a correlation coefficient evaluating part for detecting existence and nonexistence of correlation coefficients which are larger than a predetermined threshold value among the computed correlation coefficients and for evaluating large and small relation between the correlation coefficients computed by the correlation coefficient computing part and for storing as an actual location the estimation location corresponding to the correlation coefficient which is largest among the correlation coefficients computed by the correlation coefficient computing part, the first limit error being adopted to register estimate locations when the existence of correlation coefficients which are larger than a predetermined threshold value is detected in the correlation coefficient evaluating part, the second limit error being adopted to register estimate locations when the nonexistence of correlation coefficients which are larger than a predetermined threshold value is detected in the correlation coefficient evaluating part.

BRIEF DESCRIPTION OF THE DRAWINGS

The features and advantages of a vehicle location detecting method and apparatus therefor according to the present invention will be more clearly understood from the following description taken in conjunction with the accompanying drawings in which.

DESCRIPTION OF PREFERRED EMBODIMENTS

Figure 1:
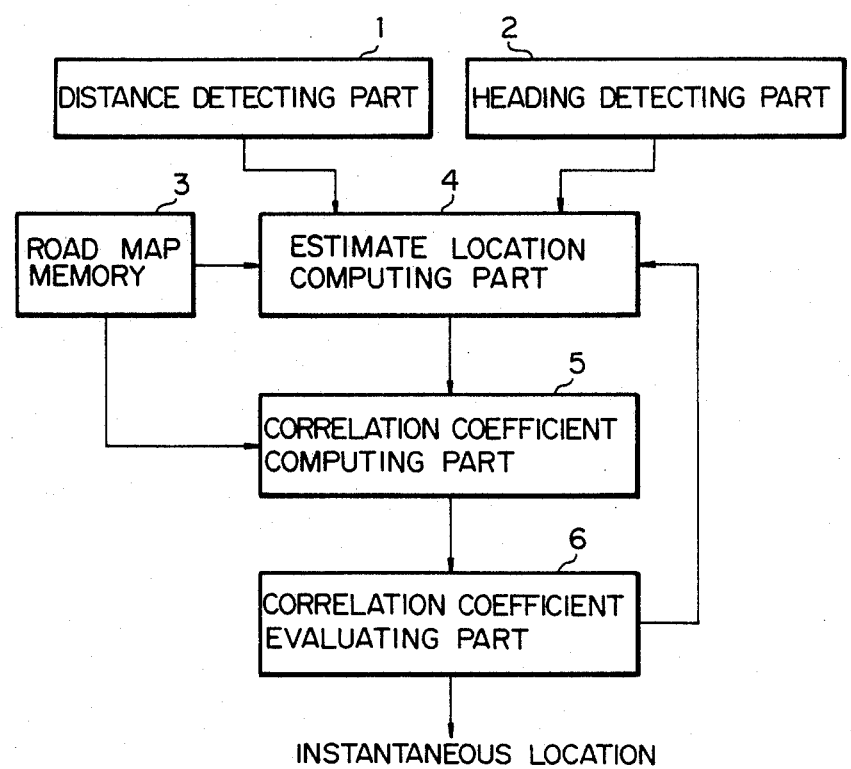
FIG. 1 is a block diagram showing an embodiment of an apparatus for carrying out a vehicle location detecting method according to this invention.

Referring now in greater detail to the drawings and initially to FIG. 1, a preferred embodiment of an apparatus for carrying out a vehicle location detecting method according to this invention is shown which comprises a distance detecting part 1 for outputting a distance detection signal, a direction or heading detecting part 2 for outputting a heading detection signal, a road map memory 3 in which road traffic network of a predetermined area is stored in advance and for outputting map data, an estimate location computing part 4 for computing an estimate location upon the distance detection signal outputted from the distance detecting part 1, the heading detection signal outputted from the heading detecting part 2, the map data outputted from the road map memory 3 and evaluation data outputted from a correlation coefficient evaluating part 6 which is to be described hereinafter and for outputting location data, a correlation coefficient computing part 5 for computing correlation coefficients upon the map data outputted from the road map memory 3 and the location data outputted from the estimate location computing part 4, and a correlation coefficient evaluating part 6 for evaluating large and small relation of the correlation coefficients computed by and outputted from the correlation coefficient computing part 5 and for outputting the present location of a vehicle.

The aforementioned distance detecting part 1 is constructed so as to output distance data $\Delta l$ representative of the distance that a vehicle has travelled, and comprises a photoelectric switch for sensing revolutions of a vehicle wheel, a counter for counting the number of pulse signals outputted from the photoelectric switch to obtain the number of revolutions of a vehicle wheel, and a multiplier for multiplying the count data outputted from the counter by a predetermined constant representative of the circumference of a vehicle wheel to calculate the distance that a vehicle has travelled per unit time. It is noted that the distance detecting part 1 may also comprise a known construction in which the distance that a vehicle has travelled is calculated by calculating the speed at which a vehicle travels using a Doppler shift and the like and integrating the vehicle speed.

The aforementioned heading detecting part 2 is constructed so as to output heading angle data $\Delta\theta$ representative of the heading angle change of vehicle travel, and comprises a magnetic sensor for outputting data representative of heading angle change per unit time by detecting the horizontal component force of earth's magnetic field, or may comprise other direction-sensitive element. For example, a gyro and the like are usable.

The aforementioned road map memory 3 has stored therein road map data of a predetermined area consisting of combination data of dots and lines representative of the heading of roadway, the distance between junction parts and the like, and comprises a semiconductor memory, cassette tape, CD-ROM or the like.

The aforementioned estimate location computing part 4 is constructed to compute present location data (Px, Py) by computing an east-west direction component dx ($=\Delta l \times \cos(\Delta\theta)$) and a south-north direction component dy ($=\Delta l \times \sin(\Delta\theta)$) of the distance $\Delta l$ that a vehicle has travelled, on the basis of the distance data $\Delta l$ outputted from the distance detecting part 1 and the heading angle data $\Delta\theta$ outputted from the heading detecting part 2, and adding the components dx and dy to a last-known location data (Px', Py'). The estimate location computing part 4 also computes a limit error E that the present location data (Px, Py) may have, by adding an increase in a limit error corresponding to the aforesaid distance data $\Delta l$ to a limit error (including a distance error, heading angle error and road map error) that the last-known location data (Px', Py') may have. Furthermore, the estimate location computing part 4 detects curves (including junctions) upon the aforesaid distance data $\Delta l$ and heading angle data $\Delta\theta$, and among the map data read out from the road map memory 3, registers locations on the roadways, which roadways are located within the limit error E of the present location data (Px, Py) as estimate locations in an appropriate memory (not shown), and also displays all the estimate locations on an appropriate display unit (not shown).

In the case that the roadways, which are located within the aforesaid limit error E, do not exist, the estimate location computing part 4 computes a first limit error E1 that the present location data (Px, Py) may have, by adding an increase in a limit error corresponding to the aforesaid distance data $\Delta l$ to a limit error (including a distance error, heading angle error and road map error) that the last-known location data (Px', Py') may have, and a second limit error E2 which is wider than the first limit error E1. It is noted that the second limit error E2 may also be a predetermined error which is wider than expectable first limit error E1 or error corresponding to the change in the first limit error E1 or maximum error of expectable location. In the case that the existence of a correlation coefficient larger than a predetermined threshold value is detected in the correlation coefficient evaluating part 6, the first limit error E1 is adopted. In the case that the nonexistence of a correlation coefficient larger than a predetermined threshold value is detected in the correlation coefficient evaluating part 6, the second limit error E2 is adopted.

The aforementioned correlation coefficient computing part 5 is constructed to compute similarity between the traces of all the estimate locations registered in the estimate location computing part 4 and the roadways stored in the road map memory 3. More specifically, the correlation coefficient varies with the distance that a vehicle has travelled, and for example, if a last-known correlation coefficient is defined in terms of $\gamma i,j$ and the correlation coefficient calculated this time is defined in terms of $\Delta \gamma j$, a new correlation coefficient $\gamma i+1,j$ can be calculated as follows:

$$\gamma i+1,j = A \times \gamma i,j + B \times \Delta \gamma j$$

where the j is a coefficient representative of the estimate location registered and the A, B are coefficients, and if $A=B=0.5$, the new correlation coefficient becomes a simple average. Concretely, the correlation coefficient of the estimate location corresponding to the roadway whose error is smallest with respect to roadway becomes largest. It is also possible that the correlation coefficient of the estimate location corresponding to the roadway whose error is smallest with respect to roadway becomes smallest by changing a computation method of the correlation coefficient.

The aforementioned correlation coefficient evaluating part 6 is constructed to evaluate the large and small relation between the correlation coefficients respectively corresponding to the estimate locations, store as an actual location the estimate location corresponding to the correlation coefficient which is largest, and erase the registrations of the remaining estimate locations. More specifically, the correlation coefficient evaluating part 6 evaluates the large and small relation between the aforesaid correlation coefficients at every predetermined interval, and erases the registration of the estimate location corresponding to the correlation coefficient which became smaller than a predetermined threshold value. As to the correlation coefficients corresponding to the estimate locations the registrations of which were not erased, they are updated in succession to new correlation coefficients by the correlation coefficient computing part 5, and the aforesaid evaluation is made again. Finally, only one estimate location is remained by repeating the evaluating operation, and the remained estimate location is to be continually displayed as a present location.

In the case that the roadways, which are located within the aforesaid limit error E, do not exist, the correlation coefficient evaluating part 6 detects the existence and nonexistence of a correlation coefficient larger than a predetermined threshold value, evaluates the large and small relation between the correlation coefficients larger than a predetermined threshold value, stores as an actual location the estimate location corresponding to the correlation coefficient which is largest, and erases the registrations of the remaining estimate locations. More specifically, the correlation coefficient evaluating part 6 detects whether a correlation coefficient larger than a predetermined threshold value exist or not, evaluates the large and small relation between the aforesaid correlation coefficients larger than a predetermined threshold value at every predetermined interval, and erases the registration of the estimate location corresponding to the correlation coefficient which became smaller than a predetermined threshold value. As to the correlation coefficients corresponding to the estimate locations the registrations of which were not erased, they are updated in succession to new correlation coefficients by the correlation coefficient computing part 5, and the aforesaid evaluation is made again. Finally, only one estimate location is remained by repeating the evaluating operation, and the remained estimate location is to be continually displayed as a present location.

The vehicle location detecting operation of the apparatus constructed as described above will hereinafter be described in detail in conjunction with FIG. 2 through FIG. 7.

Figure 2:
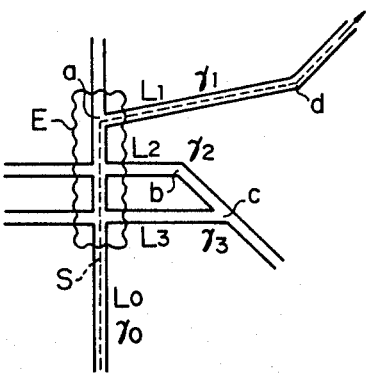
FIG. 2 is a view showing a part of road traffic network.

FIG. 2 shows a part of road traffic network, and only roadways L0, L1, L2 and L3 are illustrated. It is assumed that a vehicle travels from the roadway L0 to the roadway L1 as indicated by dot lines S. The aforesaid limit error of the present location is designated by a letter E, junctions designated by letters a and c, curves designated by letters b and d, and the correlation coefficients corresponding to the estimate locations on the roadways L0, L1, L2 and L3 designated by $\gamma 0$, $\gamma 1$, $\gamma 2$ and $\gamma 3$, respectively.

Figure 3:
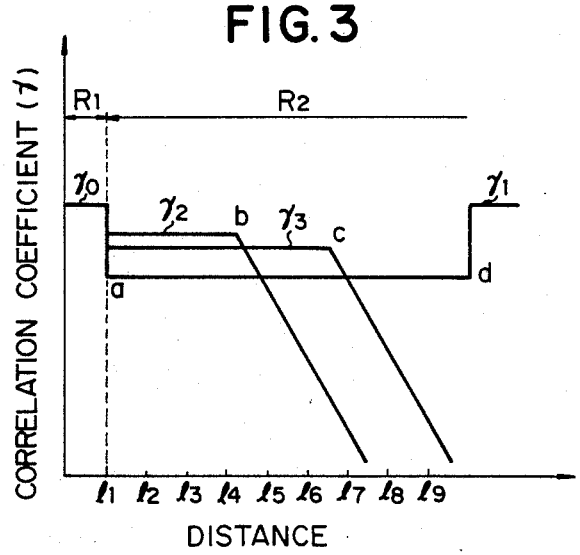
FIG. 3 shows how correlation coefficients vary when a vehicle travelled as indicated by the dot lines S in FIG. 2.

FIG. 3 shows how the correlation coefficients $\gamma$ vary when a vehicle travelled as indicated by the dot lines S in FIG. 2, and each of $\gamma 1, \gamma 2, \ldots \gamma n$ indicates a correlation coefficient updating time.

Accordingly, when the vehicle is travelling along the roadway L0, only the correlation coefficient $\gamma 0$ is large and other correlation coefficients $\gamma 1$, $\gamma 2$ and $\gamma 3$ are small (see region R1 in FIG. 3) until it is determined that the vehicle passed the junction a and entered the roadway L1 (until the heading angle change data exceeds a predetermined value). That is, since the heading angle data is small until the vehicle passes the junction a, there is no influence of other roadways L1, L2 and L3, and only the distance that the vehicle has travelled on the roadway L0 is considered. Therefore, the location data computed by the estimate location computing part 4 is corrected merely to correspond with the location data on the roadway L0. On the basis of the corrected location data, the present location of a vehicle can be confirmed by displaying the road map and the aforesaid location on the roadway L0 on the aforesaid display unit (not shown).

Next, in the case that the vehicle passed the junction a and entered the roadway L1, the respective correlation coefficients $\gamma$ corresponding to the roadways L1, L2 and L3 which are located within the limit error E are computed by the correlation coefficient computing part 5 (see region R2 in FIG. 3), and the computed correlation coefficients are evaluated by the correlation coefficient evaluating part 6. That is, it is evaluated which estimate location varies most similarly to the pattern of the roadway that the vehicle actually travels. More specifically, since the heading angle change data is more than a predetermined value, the correlation coefficient $\gamma 0$ corresponding to the roadway L0 can be ignored, and the correlation coefficients respectively corresponding to the roadways L1, L2 and L3 which are located within the limit error E must be evaluated.

In FIG. 3, when the vehicle passed in the vicinity of the junction a, the correlation coefficients $\gamma 2$ and $\gamma 3$ are larger than the correlation coefficient $\gamma 1$. This results from the errors in the heading detecting part 2 (but, generally, the correlation coefficient $\gamma 1$ corresponding to the estimate location on the roadway L1 becomes largest). However, the correlation coefficient $\gamma 2$ corresponding to the estimate location on the roadway L2 becomes rapidly small after the estimate location on the roadway L2 passed the curve b because the heading detected by the heading detecting part 2 is considerably departed from that of the roadway L2. Also, the correlation coefficient $\gamma 3$ corresponding to the estimate location on the roadway L3 becomes rapidly small after the estimate location on the roadway L3 passed the junction c because the heading detected by the heading detecting part 2 is considerably departed from that of the roadway L3. On the other hand, since the correlation coefficient $\gamma 1$ corresponding to the estimate location on the roadway L1 scarcely varies, it becomes relatively large, so that the estimate location on the roadway L1 is determined as a present location. The present location can be displayed, together with the road map, on the aforesaid display unit (not shown). That is, until the estimate location on the roadway L1 reaches the junction a, the present location can be displayed in correspondence with the location on the roadway L0, and until the estimate location on the roadway L2 passes the curve b after the estimate location on the roadway L1 passed the junction a, the present location can be displayed in correspondence with the location on the roadway L2, and until the estimate location on the roadway L3 passes the junction c after the estimate location on the roadway L2 passed the curve b, the present location can be displayed in correspondence with the location on the roadway L3, and after the estimate location on the roadway L3 passed the junction c, the present location can be displayed in correspondence with the location on the roadway L1. It is noted that, in FIG. 3, the correlation coefficient $\gamma 1$ has been set to a maximum value (for example, 1.0) in the case that the estimate location on the roadway L1 is determined as a present location.

Accordingly, thereafter, by repeating the aforementioned processes on the basis of the last-known location on the aforesaid roadway L1, an accurate present location corresponding to vehicle travel can be displayed in succession.

As to the determination of an accurate present location, it may be made only at predetermined places of roadway, for example, the curve d in FIG. 3. Also, when a correlation coefficient is less than a predetermined threshold value (not shown), the registration of the corresponding estimate location may be erased. In this case, since the registration of the estimate location corresponding to the correlation coefficient which became less than a predetermined threshold value is erased as the vehicle travels, the number of estimate locations to be registered can be reduced, and a final selection of a correlation coefficient can be made easy. Furthermore, when the difference between correlation coefficients is more than a predetermined threshold value, the registration of the estimate location corresponding to the smaller correlation coefficient may also be erased. In this case, since the registration of the estimate location corresponding to the smaller correlation coefficient is erased as the vehicle travels, the number of estimate locations to be registered can be reduced, and a final selection of a correlation coefficient can be made easy. In the case that the registration of the estimate location corresponding to the correlation coefficient which became less than a predetermined threshold value is erased after the vehicle passed a predetermined place of roadway and that the registration of the estimate location corresponding to the smaller correlation coefficient is erased after the vehicle passed a predetermined place of roadway, the influence resulting from a temporary change in a correlation coefficient can be prevented.

In the aforementioned embodiment shown in FIGS. 2 and 3, the largest correlation coefficient is changed from $\gamma 2$ to $\gamma 3$ and to $\gamma 1$ and the display on the display unit (not shown) is also transferred from the roadway L2 to the roadway L3 and to the roadway L1, but the display on the display unit (not shown) can be prevented from being transferred rapidly and more frequently to different roadways by providing a predetermined hysteresis characteristic in the case that the order of the correlation coefficients is inverted. That is, the largest correlation coefficient can be selected by providing a predetermined hysteresis characteristic in the case that the order of the correlation coefficients is inverted. Accordingly, the largest correlation coefficient is selected on the basis of the large and small relationship between correlation coefficients which have been stabilized, and an estimate location corresponding to the selected correlation coefficient can be outputted as a present location.

Figure 4:
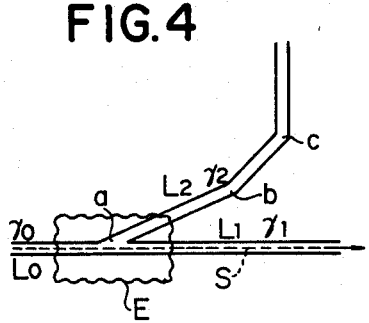
FIG. 4 is a view showing a part of road traffic network.

FIG. 4 shows a part of road traffic network, and only roadways L0, L1 and L2 are illustrated. It is assumed that a vehicle travels from the roadway L0 to the roadway L1 as indicated by dot lines S. The aforesaid limit error is designated by a letter E, a junction designated by a letter a, curves designated by letters b and c, and the correlation coefficients corresponding to the estimate locations on the roadways L0, L1 and L2 designated by $\gamma 0$, $\gamma 1$ and $\gamma 2$, respectively.

Figure 5:
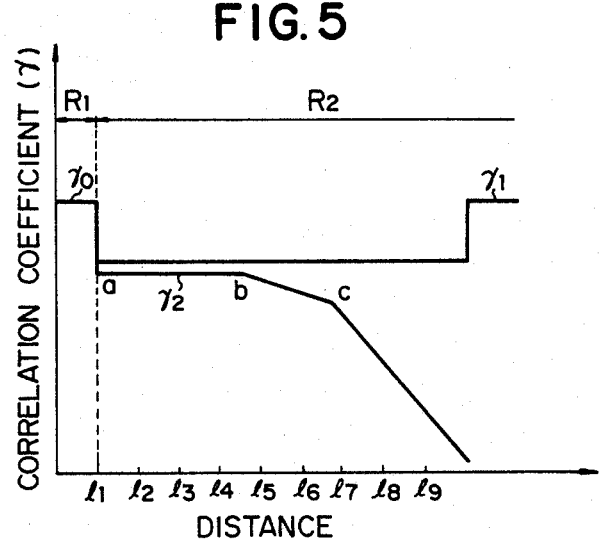
FIG. 5 shows how correlation coefficients vary when a vehicle travelled as indicated by the dot lines S in FIG. 4.

FIG. 5 shows how the correlation coefficients $\gamma$ vary when a vehicle travelled as indicated by the dot lines S' in FIG. 4, and each of l1, l2, . . . ln indicates a correlation coefficient updating time.

Accordingly, when the vehicle is travelling along the roadway L0, only the correlation coefficient $\gamma 0$ is large and other correlation coefficients $\gamma 1$ and $\gamma 2$ are small (see region R1 in FIG. 5.) until it is determined that the vehicle passed the junction a and entered the roadway L1 (until it is determined, on the basis of the distance data outputted by the distance detecting part 1, that the vehicle passed the junction a). That is, since the heading angle change data is small until the vehicle passes the junction a, there is no influence of other roadways L1 and L2, and only the distance that the vehicle has travelled on the roadway L1 is considered. Therefore, the location data computed by the estimate location computing part 4 is corrected to correspond with the location data on the roadway L0. On the basis of the corrected location data, the present location of a vehicle can be confirmed by displaying the road map and also the aforesaid location data on the roadway L0 on the aforesaid display unit (not shown).

Next, in the case that the vehicle passed the junction a and entered the roadway L1, the respective correlation coefficients $\gamma$ corresponding to the roadways L1 and L2 which are located within the limit error E are computed by the correlation coefficient computing part 5 (see region R2 in FIG. 5), and the computed correlation coefficients are evaluated by the correlation coefficient evaluating part 6. That is, it is evaluated which estimate location varies most similarly to the pattern of the roadway that the vehicle actually travels. More specifically, since the vehicle passed the junction a, the correlation coefficient 0 corresponding to the roadway L0 can be ignored, and the correlation coefficients respectively corresponding to the roadways L1 and L2 which are located within the limit error E must be evaluated. In FIG. 5, although the correlation coefficients $\gamma 1$ is slightly larger than the correlation coefficient $\gamma 2$ when the vehicle passed in the vicinity of the junction a, the estimation locations on the roadways L1 and L2 are displayed on the aforesaid display unit (not shown) because the difference between the correlation coefficients $\gamma 1$ and $\gamma 2$ are extremely small. It is noted that only the estimation location on the roadway L1 may be displayed on the display unit (not shown). However, the correlation coefficient $\gamma 2$ corresponding to the estimate location on the roadway L2 becomes small after the estimate location on the roadway L2 passed the curve b because the heading detected by the heading detecting part 2 is departed from that of the roadway L2. Furthermore, the correlation coefficient $\gamma 2$ becomes rapidly small after the estimate location on the roadway L2 passed the curve c because the heading detected by the heading detecting part 2 is considerably departed from that of the roadway L2. On the other hand, since the correlation coefficient $\gamma 1$ corresponding to the estimate location on the roadway L1 scarcely varies, it becomes relatively large, so that the estimate location on the roadway L1 is determined as a present location. The present location can be displayed, together with the road map, on the aforesaid display unit (not shown). That is, until the estimate location on the roadway L1 reaches the junction a, the present location can be displayed in correspondence with the location on the roadway L0, and until the estimate location on the roadway L2 passes the curve c after the estimate location on the roadway L1 passed the junction a, the present location can be displayed in correspondence with the locations on the roadways L1 and L2 or only the location on the roadway L1, and after the estimate location on the roadway L2 passed the curve c, the present location can be displayed in correspondence with the location on the roadway L1. It is noted that, in FIG. 5, the correlation coefficient $\gamma 1$ has been set to a maximum value (for example, 1.0) in the case that the estimate location on the roadway L1 is determined as a present location.

Accordingly, thereafter, by repeating the aforementioned processes on the basis of the last-known location on the aforesaid roadway L1, an accurate present location corresponding to vehicle travel can be displayed in succession.

In the aforementioned embodiments shown in FIGS. 2 and 4, the limit errors E and E are different from each other, and the limit error shown in FIG. 2 is larger than that shown in FIG. 4. The reason is that a straight distance that a vehicle travels is longer. However, in an urban district, a vehicle generally reaches junctions or curves before the limit error E becomes too large, so that two or more roadways are rarely located within the limit error E. Even if two or more roadways are located within the limit error E, it is rare that, even if temporary, the location on a different roadway is determined as a present location as in the case of FIG. 3, because in many cases the correlation coefficient corresponding to the roadway that a vehicle actually travels is generally large.

Figure 6:
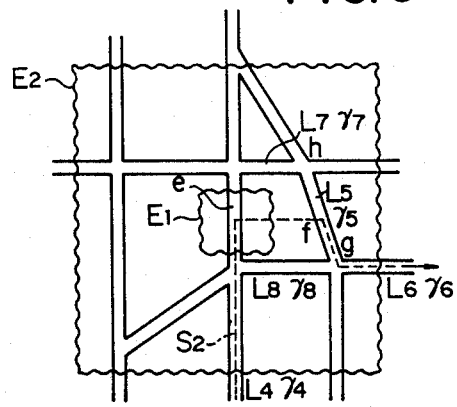
FIG. 6 is a view showing a part of road traffic network.

FIG. 6 shows a part of road traffic network, and it is assumed that a vehicle travels from the roadway L4 to roadways L5 and L6 through roadway which is not shown in the road map as indicated by dot lines S2. This embodiment is the case that registered roadways are not located within the first limit error. The first and second limit errors of the present location are designated by letters E1 and E2, junctions designated by letters e, f, g and h (including not only junctions shown in the road map but also junctions not shown in the road map), and the correlation coefficients corresponding to the estimate locations on the roadways L4, L5, L6, L7 and L8 designated by $\gamma 4$, $\gamma 5$, $\gamma 6$, $\gamma 7$ and $\gamma 8$, respectively.

Figure 7:
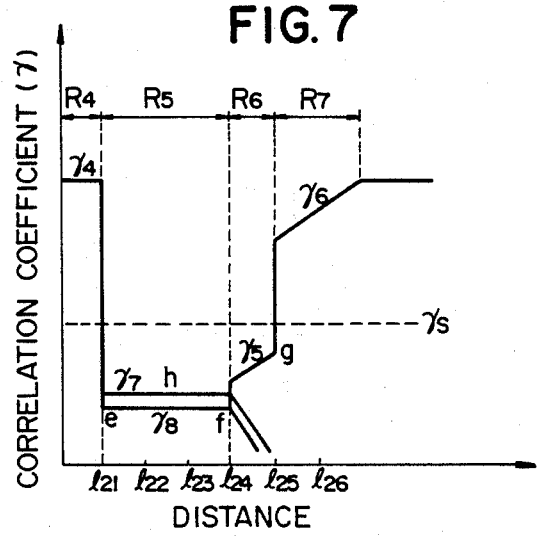
FIG. 7 shows how correlation coefficients vary when a vehicle travelled as indicated by the dot lines S2 in FIG. 6.

FIG. 7 shows how the correlation coefficients $\gamma$ vary when a vehicle travelled as indicated by the dot lines S2 in FIG. 6, and each of $t21$, $t22$, ... $t2n$ indicates a correlation coefficient updating time.

Accordingly, when the vehicle is travelling along the roadway L4, only the correlation coefficient $\gamma 4$ is large and other correlation coefficients $\gamma 5$, $\gamma 6$ and $\gamma 7$ are small (see region R4 in FIG. 7.) until it is determined that the vehicle passed the junction e and is changed considerably in heading (until the heading angle change data exceeds a predetermined value). That is, since the heading angle change data is small until the vehicle passes the junction e, there is no influence of other roadways, and only the distance that the vehicle has travelled on the roadway L4 is considered. Therefore, the location data computed by the estimate location computing part 4 is corrected merely to correspond with the location data on the roadway L4. On the basis of the corrected location data, the present location of a vehicle can be confirmed by displaying the road map and the aforesaid location on the roadway L4 on the aforesaid display unit (not shown).

Next, in the case that the vehicle passed the junction e and was departed from the roadway L4, registered roadways are not located within the first limit error E1, and thereafter, the condition that any registered roadways are not located within the first limit error E1, that is, the condition that the correlation coefficients with respect to registered roadways are all less than a predetermined threshold value, continues. Accordingly, the detection of vehicle location is made on the basis of the output signal from the distance detecting part 1 and the output signal from the heading detecting part 2, and the estimate location thus obtained in accordance with the aforementioned dead reckoning (in which the present location of a vehicle is obtained by adding the amount of changes in distance and heading to a last-known distance and heading) is displayed on the display unit (not shown) until the registered roadway whose correlation coefficient is large is obtained.

And, at this time, correlation coefficients are computed on the basis of registered roadways which are located within the second limit error E2 which is wider than the first limit error E1 and of the estimate location obtained by the dead reckoning (see region R5 in FIG. 7).

While the vehicle is travelling from the junction e toward the junction f, the roadways L7 and L8 are located near the vehicle and furthermore the headings of the roadways are relatively similar to that of the vehicle travel, but the dead reckoning is continued because the correlation coefficients $\gamma 7$, $\gamma 8$ corresponding to the roadways L7 and L8 are less than a threshold value by which roadway is determined as roadway that a vehicle actually travels.

If the vehicle turns to the right at the junction f, the correlation coefficients $\gamma7$, $\gamma8$ corresponding to the registered roadways L7 and L8 are rapidly reduced because the headings of the roadways L7 and L8 are considerably different from that of vehicle travel, and the correlation coefficient 5 corresponding to the roadway L5 is rapidly increased because the roadway L5 is located very near to the vehicle and furthermore the heading of the roadway is very similar to that of vehicle travel (see region R6 in FIG. 7).

Thereafter, if the vehicle turns to the left at the junction g, the road pattern from the roadway L5 to the roadway L6 becomes very similar to the route that the vehicle travelled, and furthermore the roadway L6 is located very near to the vehicle and the heading of the roadway L6 is very similar to that of vehicle travel, so that the correlation coefficient $\gamma6$ is more rapidly increased and becomes larger than a predetermined threshold value $\gamma s$. Accordingly, the roadway L6 is determined as roadway that the vehicle actually travels (see region R7 in FIG. 7).

At this time, since correlation coefficients corresponding to other registered roadways are not large, the registrations of other roadways are erased, and the location on the roadway L6 is displayed as a present location.

It is noted that, in the aforementioned embodiment shown in FIGS. 6 and 7, there were not a plurality of registered roadways whose correlation coefficients are large (there were not a plurality of registered roadways which are larger than a predetermined threshold value $\gamma s$ or there were not a plurality of registered roadways which have a difference larger than a predetermined value), but in the case that there are a plurality of registered roadways whose correlation coefficients are large, the observation and evaluation of correlation coefficients which vary with vehicle travel thereafter is made, and when a predetermined condition (for example, a condition that a correlation coefficient of the roadway is larger than a predetermined threshold value s and larger than other correlation coefficients by a predetermined value) is met, the estimate location on the corresponding roadway is determined as a present location. At this time, the registrations of other estimation locations are erased.

In the case that the aforesaid predetermined condition was not met, the location detection is continued with the condition that there are a plurality of the corresponding roadways, and only the correlation coefficient which is largest is outputted as a present location. Even this case, since the aforesaid predetermined condition is met after a vehicle travelled a predetermined distance, when the condition is met, the registrations of other estimate locations are erased and only the corresponding location is registered as a present location.

Also, in the aforementioned embodiment shown in FIGS. 6 and 7, error is scarcely involved in the estimate location, but even if the case that error is involved in the estimate location and that, for example, when the vehicle is located at the junction e, it is determined that the vehicle is located at the junction h, by the same method described above, an accurate roadway can be registered and an accurate present location can be detected. In other words, if the pattern of vehicle travel coincides with the road map, an accurate present location can be finally detected as long as error is within the maximum value of the limit error even if error is involved in an initial location.

In the case that the vehicle is travelling parts (narrow roadways, vacant land and the like) which are not registered in the road map and that a large error is originally involved in the estimate location, there is no guarantee that at least one roadway is located within relatively narrow first limit error E1, and it is impossible to register an estimate location as a location on registered roadways. Therefore, in this case, the estimate location is obtained by the dead reckoning, and at the same time, the second limit error E2 which is wider than the first limit error E1 is adopted, the correlation coefficients corresponding to the roadways, which roadways are located within the second limit error E2, are computed, and the dead reckoning is continued, registering the computed correlation coefficients. That is, since the estimation of a present location is made on the basis of only the distance that a vehicle has travelled and the heading of vehicle travel although the relation to the road map is considered to a certain degree, the present location can be estimated with the condition that a relatively wide range of road map is considered. Accordingly, upon change in a correlation coefficient, the detection of an accurate present location can be made as follows.

And, in the case that a correlation coefficient met a predetermined condition (a correlation coefficient of the roadway was larger than a predetermined threshold value and larger than other correlation coefficients by a predetermined value), the location on the roadway corresponding to the correlation coefficient is adopted as a present location, and thereafter, the estimation of a present location can be made, considering the correlation to roadways.

In the aforementioned embodiment shown in FIGS. 6 and 7, as to computation of a correlation coefficient when the second limit error E2 is adopted, it is not always necessary to compute momentarily because the estimation of a present location is made by the dead reckoning and a present location corresponding to the estimate location detected according to the dead reckoning can be detected from registered roadways within a certain degree of time.

Furthermore, in the case that the error in an estimate location was more than the second limit error E2 for some reasons, an accurate roadway cannot be detected. Therefore, in the case that the second limit error E2 is adopted and an accurate roadway cannot be detected even if a vehicle travels a predetermined distance, a third limit error which is wider than the second limit error E2 or a limit error wider than the third limit error is adopted. In this case, since the number of registered roadways is increased as a limit error is wider, by classifying roadways and reducing processing time for each classified roadways, a reliable detection of a present location be made within a predetermined time.

That is, by limiting registered roadways only to main arterial roadways or limiting registered roadways to roadways that a vehicle may travel with high probability in consideration of the characteristic of travel of a subject vehicle, the number of roadways to be registered can be reduced and processing time can be shortened. In this case, only the computation of correlation coefficients corresponding to main arterial roadways or roadways that a vehicle may travel with high probability is made, but it is rare that a vehicle continually travels only narrow roadways and has been departed from a subject region for a long time. Therefore, after a vehicle travels a certain distance, an accurate roadway can be finally registered and an accurate present location can be detected.

Also, the aforementioned embodiment shown in FIGS. 6 and 7 is applied to a navigation system in which the detected location on the road map is visually displayed, and in the case that error in an estimate location became increased for some reasons, the estimate location can be manually corrected to coincide with an accurate present location by an operator, but since the estimate location can be corrected automatically, operation performance is remarkably enhanced. Accordingly, in the case that the detected location is not displayed visually in the interior of a vehicle as in the case of a location system, the reliability in the whole system can be remarkably enhanced because the error in the estimate location can be automatically corrected after a vehicle travels a certain distance.

From the foregoing descriptions, it will be seen that the present invention is applicable to a navigation system, wherein a present location and destination are displayed together with road map to direct a vehicle to the destination, by displaying in the interior of a vehicle the output of present location. And also, the present invention is applicable to a location system, wherein the locations of a large number of vehicles are detected, by transmitting the output of a present location from a vehicle via radio waves and receiving the radio waves at a central base station.

It is noted that this invention is not limited to the aforementioned embodiments. For example, in the case that there are a plurality of estimation locations corresponding to the correlation coefficient which is largest, it is possible to output as a present location the estimate location which is nearest to the center of the roadway. Also, it is possible to calculate the distance that a vehicle travels and the heading change at every predetermined time instead of at every predetermined distance.

Also, in the embodiment shown in FIG. 6, as to the determination of an accurate present location, it may be made only at predetermined places of roadway as stated in the embodiment shown in FIG. 2. Furthermore, when a correlation coefficient is less than a predetermined threshold value (not shown), the registration of the corresponding estimate location may be erased. Furthermore, when the difference between correlation coefficients is more than a predetermined threshold value, the registration of the estimate location corresponding to the smaller correlation coefficient may also be erased. Furthermore, as stated in the embodiment shown in FIG. 2, in the case that the registration of the estimate location corresponding to the correlation coefficient which became less than a predetermined threshold value is erased after the vehicle passed a predetermined place of roadway and that the registration of the estimate location corresponding to the smaller correlation coefficient is erased after the vehicle passed a predetermined place of roadway, the influence resulting from a temporary change in a correlation coefficient can be prevented. Also, in the case that the order of the correlation coefficients is inverted, the correlation coefficient which is largest is selected by providing a predetermined hysteresis characteristic.

It should be noted that the foregoing descriptions relate only to preferred embodiments of this present invention and that certain obvious modifications and alternations may be made without departing from the spirit and scope of this invention.

From the foregoing descriptions, it will be seen that an improved vehicle location detecting method and apparatus therefor, which are capable of detecting an accurate present vehicle location without being subjected to the influence of complexity of road traffic network, errors in road map, a part omission of road map, sensor error and the like, is afforded by the present design. That is, it is evaluated which estimate location varies most similarly to the pattern of the road that a vehicle actually travels, by registering the distance and heading errors that are inherent in distance and heading sensors and the location data corresponding to all the roadways which are located within a limit amount of error in road map, and computing the correlation coefficients corresponding to all the roadways. As a result, even if the road pattern of the district that a vehicle travels were complicated or even if a plurality of streets or roadways existed in a congested condition, two or more estimate locations including an accurate present location could be maintained, and even if an inaccurate estimate location were temporarily outputted as a present location, an accurate estimate location could be outputted as a present location on the basis of the change in the correlation coefficient thereafter. In the case that registered roadways, which are located within a first limit error, do not exist, a second limit error which is wider than the first limit error is adopted, and an estimate location is detected by dead reckoning, evaluating the similarity of roadway with respect to the pattern of roadway that a vehicle actually travels. Therefore, even if the road pattern of the district that a vehicle travels were complicated, even if there were a plurality of roadways in congested condition, even if a vehicle travelled part other than registered roadways, or even if error in an estimate location became increased for some reasons, two or more estimate locations including an accurate present location could be maintained, and even if an inaccurate estimate location were temporarily outputted as a present location, an accurate estimate location could be outputted as a present location on the basis of the change in the correlation coefficient thereafter. As a result, the present invention can remarkably enhance the accuracy and reliability in location detection without being subjected to the influence of vehicle travel condition.

What we claim is:

1. A vehicle location detecting method for detecting the location of a vehicle within a predetermined area, comprising the steps of:
   a. outputting distance data at every predetermined interval, the distance data being representative of the distance that a vehicle has travelled,
   b. outputting heading angle data at every predetermined interval, the heading angle data being representative of the heading angle change of vehicle travel,
   c. storing road map data representative of roadways,
   d. computing a present location data from said distance data and said heading angle data, and a limit error of said present location data which is determined by errors in said distance data, in said heading angle data and in said road map data, and registering locations on the roadways, which roadways are located within said limit error of said present location data, as estimate locations, e. computing correlation coefficients corresponding to said registered estimate locations, and f. selecting a correlation coefficient whose error is smallest with respect to the roadway from said computed correlation coefficients and outputting the registered estimate location corresponding to said selected correlation coefficient as a present location.

2. A vehicle location detecting method as set forth in claim 1, in which said correlation coefficient whose error is smallest with respect to the roadway is selected by selecting the correlation coefficient which is largest among said computed correlation coefficients and in which the estimate location corresponding to said correlation coefficient which is largest among said computed correlation coefficients is outputted as a present location.

3. A vehicle location detecting method as set forth in claim 2, in which when said computed correlation coefficient is less than a predetermined value, registration of the corresponding estimate location is erased.

4. A vehicle location detecting method as set forth in claim 2, in which, when the difference between said computed correlation coefficients is more than a predetermined value, registration of the estimate location corresponding to the smaller correlation coefficient is erased.

5. A vehicle location detecting method as set forth in claim 3, in which said registration of the corresponding estimate location is erased after the vehicle passed a predetermined place of the roadway.

6. A vehicle location detecting method as set forth in claim 4, in which said registration of the estimate location corresponding to the smaller correlation coefficient is erased after the vehicle passed a predetermined place of the roadway.

7. A vehicle location detecting method as set forth in claim 2, in which said correlation coefficient which is largest is selected by providing a predetermined hysteresis characteristic in the case that the order of the correlation coefficients is inverted.

8. A vehicle location detecting method as set forth in claim 2, in which, in the case that there are a plurality of estimation locations corresponding to said correlation coefficient which is largest, the estimate location which is nearest to a center of the roadway is outputted as a present location.

9. A vehicle location detecting method as set forth in claim 1, in which said distance data representative of the distance that a vehicle has travelled is outputted at every predetermined time and in which said heading angle data representative of the heading angle change of vehicle travel is outputted at every predetermined time.

10. A vehicle location detecting method as set forth in claim 1, in which said distance data representative of the distance that a vehicle has travelled is outputted at every predetermined distance and in which said heading angle data representative of the heading angle change of vehicle travel is outputted at every predetermined distance.

11. A vehicle location detecting method as set forth in claim 1, in which an east-west direction component $Px$ and a south-north direction component $Py$ of said present location data are computed by computing an east-west direction component $dx (= distance \times \cos(-\text{heading angle change}))$ and a south-north direction component $dy (= distance \times \sin(\text{heading angle change}))$ of the distance that a vehicle has travelled upon said distance data representative of the distance that a vehicle has travelled and said heading angle data of representative of the heading angle change of vehicle travel, and by adding said computed components $dx$ and $dy$ to an east-west direction component $Px'$ and a south-north direction component $Py'$ of a last-known location data, respectively.

12. A vehicle location detecting method as set forth in claim 1, in which said steps (d) through (f) are repeated.

13. A vehicle location detecting method for detecting the location of a vehicle within a predetermined area, comprising the steps of:

a. outputting distance data at every predetermined interval, the distance data being representative of the distance that a vehicle has travelled, b. outputting heading angle data at every predetermined interval, the heading angle data being representative of the heading angle change of vehicle travel, c. storing road map data representative of roadways, d. computing a present location data from said distance data and said heading angle data, a first limit error of said present location data which is determined by errors in said distance data, in said heading angle data and in said road map data, and a wider limit error of said present location data which is wider than said first limit error, and registering locations on the roadways, which roadways are located within said first limit error of said present location data, as estimate locations, e. computing correlation coefficients corresponding to said registered estimate locations, f. selecting a correlation coefficient whose error is smallest with respect to the roadway from said computed correlation coefficients and outputting the registered estimate location corresponding to said selected correlation coefficient as a present location, and g. if the roadways, which are located within said first limit error of said present location data, do not exist, outputting said present location data computed from said distance data and said heading angle data as a present location, registering locations on the roadways, which roadways are located within said wider limit error of said present location data, as estimate locations, and when a correlation coefficient, whose error is less than a predetermined value and smallest with respect to each roadway of the registered estimate locations, is obtained, outputting the estimate location corresponding to the correlation coefficient as a present location.

14. A vehicle location detecting method as set forth in claim 13, in which said correlation coefficient whose error is smallest with respect to the roadway is selected by selecting the correlation coefficient which is largest among said computed correlation coefficients and in which the estimate location corresponding to said correlation coefficient which is largest among said computed correlation coefficients is outputted as a present location.

15. A vehicle location detecting method as set forth in claim 14, in which when said computed correlation coefficient is less than a predetermined value, registration of the corresponding estimate location is erased.

16. A vehicle location detecting method as set forth in claim 14, in which, when the difference between said computed correlation coefficients is more than a predetermined value, registration of the estimate location corresponding to the smaller correlation coefficient is erased.

17. A vehicle location detecting method as set forth in claim 15, in which said registration of the corresponding estimate location is erased after the vehicle passed a predetermined place of the roadway.

18. A vehicle location detecting method as set forth in claim 16, in which said registration of the estimate location corresponding to the smaller correlation coefficient is erased after the vehicle passed a predetermined place of the roadway.

19. A vehicle location detecting method as set forth in claim 14, in which said correlation coefficient which is largest is selected by providing a predetermined hysteresis characteristic in the case that the order of the correlation coefficients is inverted.

20. A vehicle location detecting method as set forth in claim 14, in which, in the case that there are a plurality of estimation locations corresponding to said correlation coefficient which is largest, the estimate location which is nearest to a center of the roadway is outputted as a present location.

21. A vehicle location detecting method as set forth in claim 13, in which said distance data representative of the distance that a vehicle has travelled is outputted at every predetermined time and in which said heading angle data representative of the heading angle change of vehicle travel is outputted at every predetermined time.

22. A vehicle location detecting method as set forth in claim 13, in which said distance data representative of the distance that a vehicle has travelled is outputted at every predetermined distance and in which said heading angle data representative of the heading angle change of vehicle travel is outputted at every predetermined distance.

23. A vehicle location detecting method as set forth in claim 13, in which correlation coefficients corresponding to all said roadways which are located within said wider limit error are evaluated.

24. A vehicle location detecting method as set forth in claim 23, in which, in said wider limit error, said roadways are classified and the correlation coefficients corresponding to the classified roadways are evaluated.

25. A vehicle location detecting method as set forth in claim 23, in which, in the case that said wider limit error consists of a plurality of limit errors which are different in size, while the vehicle travels a predetermined distance, correlation coefficients corresponding to subject roadways are evaluated in order of narrower limit error until an estimate location corresponding to a correlation coefficient whose error is less than a predetermined value and smallest.

26. A vehicle location detecting method as set forth in claim 25, in which as the size of said wider limit error increases, correlation coefficients corresponding to arterial roadways are evaluated.

27. A vehicle location detecting method as set forth in claim 25, in which considering characteristic of vehicle travel, correlation coefficients corresponding to roadways that the vehicle may travel with high probability are evaluated as the size of said wider limit error increases.

28. A vehicle location detecting method as set forth in claim 13, in which an east-west direction component Px and a south-north direction component Py of said present location data are computed by computing an east-west direction component dx (=distance x cos(-heading angle change)) and a south-north direction component dy (=distance x sin(heading angle change)) of the distance that a vehicle has travelled upon said distance data representative of the distance that a vehicle has travelled and said heading angle data of representative of the heading angle change of vehicle travel, and by adding said computed components dx and dy to an east-west direction component Px' and a south-north direction component Py' of a last-known location data, respectively.

29. A vehicle location detecting method as set forth in claim 13, in which said steps (d) through (f) are repeated.

30. A vehicle location detecting apparatus for detecting the location of a vehicle within a predetermined area, comprising
   a distance detecting part for outputting distance data representative of the distance that a vehicle has travelled,
   a heading detecting part for outputting heading angle data representative of the heading angle change of vehicle travel,
   a road map memory for storing therein road map data of a predetermined area, the road map data being representative of roadways,
   an estimate location computing part for computing a present location data from said distance data and said heading angle data, and a limit error of said present location data which is determined by errors in said distance data, in said heading angle data and in said road map data, and for registering locations on the roadways, which roadways are located within said limit error of said present location data, as estimate locations,
   a correlation coefficient computing part for computing correlation coefficients corresponding to said estimate locations, and
   a correlation coefficient evaluating part for evaluating large and small relation between said correlation coefficients computed by said correlation coefficient computing part and for storing as an actual location the estimation location corresponding to the correlation coefficient which is largest among said correlation coefficients computed by said correlation coefficient computing part.

31. A vehicle location detecting apparatus as set forth in claim 30, further comprising display means for displaying said actual location.

32. A vehicle location detecting apparatus for detecting the location of a vehicle within a predetermined area, comprising
   a distance detecting part for outputting distance data representative of the distance that a vehicle has travelled,
   a heading detecting part for outputting heading angle data representative of the heading angle change of vehicle travel,
   a road map memory for storing therein road map data of a predetermined area, the road map data being representative of roadways,
   an estimate location computing part for computing a present location data from said distance data and said heading angle data, a first limit error of said present location data which is determined by errors in said distance data, in said heading angle data and in said road map data, and a second limit error which is wider than said first limit error, and for registering locations on the roadways, which roadways are located within said limit error of said present location data, as estimate locations, a correlation coefficient computing part for computing correlation coefficients corresponding to said estimate locations, and a correlation coefficient evaluating part for detecting existence and nonexistence of correlation coefficients which are larger than a predetermined threshold value among said computed correlation coefficients and for evaluating large and small relation between said correlation coefficients computed by said correlation coefficient computing part and for storing as an actual location the estimation location corresponding to the correlation coefficient which is largest among said correlation coefficients computed by said correlation coefficient computing part, the first limit error being adopted to register estimate locations when said existence of correlation coefficients which are larger than a predetermined threshold value is detected in said correlation coefficient evaluating part, the second limit error being adopted to register estimate locations when said nonexistence of correlation coefficients which are larger than a predetermined threshold value is detected in said correlation coefficient evaluating part.

33. A vehicle location detecting apparatus as set forth in claim 32, further comprising display means for displaying said actual location.

* * * * *